(12) United States Patent
Donadio et al.

(10) Patent No.: US 8,321,369 B2
(45) Date of Patent: Nov. 27, 2012

(54) ANTI-INTRUSION METHOD AND SYSTEM FOR A COMMUNICATION NETWORK

(75) Inventors: Pasquale Donadio, Naples (IT); Andrea Paparella, Busto Arsizio (IT); Roberto Riglietti, Vimercate (IT)

(73) Assignee: Alcatel Lucent, Paris (FR)

( * ) Notice: Subject to any disclaimer, the term of this patent is extended or adjusted under 35 U.S.C. 154(b) by 769 days.

(21) Appl. No.: 12/459,247

(22) Filed: Jun. 29, 2009

(65) Prior Publication Data

US 2010/0017357 A1    Jan. 21, 2010

(30) Foreign Application Priority Data

Jul. 4, 2008   (EP) .................................. 08425464

(51) Int. Cl.
*G06F 21/00* (2006.01)
*G06F 15/173* (2006.01)
(52) U.S. Cl. ................ 706/54; 726/11; 726/13
(58) Field of Classification Search .............. 706/54
See application file for complete search history.

(56) References Cited

U.S. PATENT DOCUMENTS

2003/0159064 A1 *   8/2003   Takahashi ................ 713/200

FOREIGN PATENT DOCUMENTS

WO     WO 2006080930        8/2006

* cited by examiner

*Primary Examiner* — Alan Chen
*Assistant Examiner* — Nathan Brown, Jr.
(74) *Attorney, Agent, or Firm* — Carmen Patti Law Group, LLC

(57) ABSTRACT

There is disclosed an anti-intrusion method for a communication network comprising a plurality of network elements. The method comprising the following steps: a) providing a passive monitoring component, a decision making component, and an action making component cooperating with the communication network; b) at the passive monitoring component, detecting management information indicative of an attack against at least one network element, processing the management information thus generating infection data and transmitting the infection data to the decision making component; c) at the decision making component, receiving the infection data, making a decision about an action to be carried out to block the attack, and transmitting the decision to the action making component; and d) at the action making component, based on the decision, instructing the at least one network element to perform the action.

10 Claims, 4 Drawing Sheets

ANTI-INTRUSION METHOD AND SYSTEM FOR A COMMUNICATION NETWORK

FIELD OF THE INVENTION

The invention is based on a priority application EP08425464.8 filed Jul. 4, 2008 which is hereby incorporated by reference.

The present invention relates to the field of the communication systems. In particular, the present invention relates to an anti-intrusion method and system for a communication network.

BACKGROUND OF THE INVENTION

As it is known, a communication network comprises three logical main planes, i.e. a data plane, which is the plane suitable for transmitting user data, a control plane, which is the plane suitable for executing control operations, and a management plane, which is the plane suitable for executing management operations.

Managing a communication network provides to perform a number of operations, such as for instance:
  monitoring network performance;
  configuring network elements and their resources (boards, ports, cross-connections, etc.);
  managing errors occurring in the network; etc.

Typically, the management operations are performed by an apparatus which is termed "network management station or system" (or, briefly, NMS), which is connected to each network element of the network to be managed.

In particular, the NMS is provided with a software application which is termed "manager", capable of exchanging information with software applications which are termed "agent", which agents are placed at the network elements. Manager and agents exchange each other management information by using a management protocol, which is executed in the management plane and depends on the type of communication network. Examples of management protocols are SNMP (Simple Network Management Protocol), CMIP (Common Management Information Protocol), Q3, and TL1.

Owing to their function, the control plane and the management plane are particularly subjected to attacks by the so-called "hackers". In the following description and in the claims, the term "attack" will designate an attempt by an hacker to introduce unauthorized software in the communication network and/or to manipulate in a unauthorized way the management and control software managing and controlling the communication network. Possible types of attacks are:
  DOS (Denial of Service) attacks, which substantially aim to generate an inefficiency, that could result in a malfunctioning of the network element;
  malware reproductions, which aim to open a so-called "backdoor" in the network element, thereby favoring unauthorized accesses; and
    diffusion of Trojan horses, worms, key loggers, and virus.

Generally speaking, the data plane is secure as such, as it does not interact in any way with the software applications of the network elements. In other words, user data are transported in a transparent way in the data plane, i.e. the software applications of the network elements do not process the user data.

In the following description and in the claims, the expression "anti-intrusion mechanism-system-method" will designate a mechanism-system-method implemented in a communication network and suitable for isolating one or more network elements which are subjected to an attack from the other network elements of the network. Un elemento di rete soggetto ad un attacco verrà anche indicato "elemento di rete infetto".

In the art, a number of anti-intrusion mechanisms are known, such as for instance asymmetric cryptography, one-way hash functions, and the like. These known anti-intrusion mechanisms typically provide coding/decoding keys, such as typically a public coding/decoding key, which is known by everybody, and a private coding/decoding key, which is kept secret. The public and private coding/decoding keys are related one to another. In particular, information coded by the public coding key can be decoded only by the corresponding private decoding key, and vice versa information coded by the private coding key can be decoded only by the corresponding public decoding key.

SUMMARY OF THE INVENTION

The Applicant has noticed that in the field of the communication networks it is desirable to provide management systems based on web technology. This is mainly due to the fact that management systems operating in this way advantageously allow to use management graphic interfaces similar to the graphic interfaces of current computer programs for browsing the web (which are commonly termed "web browsers"), such as Mozilla, Internet Explorer, etc.

The Applicant has noticed that a management system could thus be implemented through a browser executed by the NMS and capable of supporting a web-like management graphical interface, wherein the management information are displayed as graphic objects typical of the web interfaces, i.e. windows, icons, etc.

Using network management system based on web technology, together with the even more widespread employment of "open-source" software, result in a increased vulnerability of the network elements. Therefore, on one hand the development of management systems based on web technology brings advantages in terms of accessibility of a communication network, while on the other hand it disadvantageously makes the communication networks, and in particular the above mentioned control plane and management plane, more vulnerable to attacks by "hackers".

The Applicant has noticed that known anti-intrusion mechanisms have a number of drawbacks, when applied to the management system of a communication network above described.

Firstly, they are passive mechanisms from the decisional point of view. In other words, these mechanisms detect an anomalous traffic within the network, which anomalous traffic generally indicates that the communication network is undergoing an attack, and they transmit to the operator a visual and/or acoustic alarm signal. In turn, the operator stops the traffic, for example by isolating the infected network element by closing the ports through which the anomalous traffic transit, and he analyses the network thereby detecting the cause of the anomaly. Therefore, these mechanisms present a delay between the detection time of the attack and the time at which the infected network element is isolated by the intervention of the operator. Then, disadvantageously, the operator may intervene when the damage is already particularly broaden.

Secondly, known anti-intrusion mechanisms are onerous in terms of the calculation resources employed.

Further, if for example a hacker enters the management plane of the communication network, he may change the management configuration of the network elements. Existing anti-intrusion mechanisms disadvantageously operate by stopping the whole network elements and thus also the user data processing.

Therefore, the Applicant has faced the problem to provide an anti-intrusion method and system for a communication network capable of overcoming at least one of the above mentioned drawbacks.

In particular, the Applicant has faced the problem to provide an anti-intrusion method and system for a communication network which present a particularly reduced delay between the detection time of the attack and the time at which the infected network element is isolated from the other network elements.

According to a first aspect, the present invention provides an anti-intrusion method for a communication network, the communication network comprising a plurality of network elements, the method comprising the following steps:
a) providing a passive monitoring component, a decision making component and an action making component cooperating with the communication network;
b) at the passive monitoring component, detecting management information indicative of an attack against at least one network element of the plurality of network elements, processing the management information thus generating infection data, and transmitting the infection data to the decision making component;
c) at the decision making component, receiving the infection data, making a decision about an action to be carried out to block the attack, and transmitting the decision to the action making component; and
d) at the action making component, based on the decision, instructing the at least one network element to perform the action.

Preferably, step a) comprises providing the passive monitoring component at each of the plurality of network elements.

Profitably, step a) further comprises providing the decision making component and the action making component at one of the plurality of network elements.

Alternatively, step a) further comprises providing the decision making component and the action making component at each of the plurality of network elements.

Alternatively, step a) comprises providing the decision making component at one of the plurality of network elements and providing the action making component at another one of the plurality of network elements.

Alternatively, step a) further comprises at least one of the following steps:
providing the decision making component at at least two of the plurality of network elements, thus forming a decision making cluster; and
providing the action making component at at least another two of the plurality of network elements, thus forming an action making cluster.

Preferably, step c) further comprises making the decision by using at least one of a static association table and a dynamic association table, each of the static association table and the dynamic association table comprising a plurality of rows, each of the plurality of rows including a security threshold value and a possible action associated to the security threshold value.

According to a second aspect, the present invention provides a anti-intrusion system for a communication network, the communication network comprising a plurality of network elements, the system comprising: a passive monitoring component, a decision making component, and an action making component cooperating with the communication network, wherein:
the passive monitoring component is suitable for detecting management information indicative of an attack against at least one network element of the plurality of network elements, processing the management information thus generating infection data, and transmitting the infection data to the decision making component;
the decision making component is suitable for receiving the infection data, making a decision about an action to be carried out to block the attack, and transmitting the decision to the action making component; and
the action making component is suitable for, based on the decision, instructing the at least one network element to perform the action.

Preferably, the passive monitoring component is provided at each of the plurality of network elements.

Profitably, the decision making component and the action making component are provided at one of the plurality of network elements.

Alternatively, the decision making component and the action making component re provided at each of the plurality of network elements.

Alternatively, the decision making component is provided at one of the plurality of network elements and the action making component is provided at another one of the plurality of network elements.

Alternatively, the decision making component is provided at at least two of the plurality of network elements, thus forming a decision making cluster; and/or the action making component is provided at at least another two of the plurality of network elements, thus forming an action making cluster.

Preferably, the system further comprises at least one of a static association table and a dynamic association table, each of the static association table and the dynamic association table comprising a plurality of rows, each of the plurality of rows including a security threshold value and a possible action associated to the security threshold value, the decision making component being suitable for making the decision by using the at least one of a static association table and a dynamic association table.

BRIEF DESCRIPTION OF THE DRAWINGS

The present invention will be better understood by reading the following detailed description, given by way of example and not of limitation, to be read by referring to the accompanying drawings, wherein.

DETAILED DESCRIPTION OF PREFERRED EMBODIMENTS OF THE INVENTION

Figure 1:
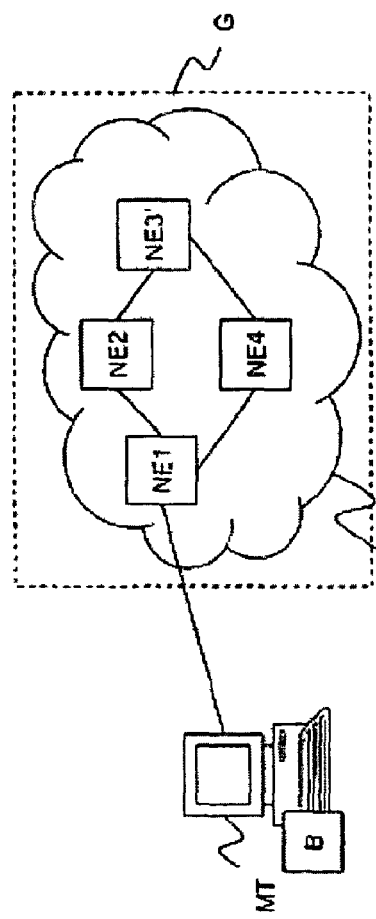
FIG. 1 schematically shows a communication network provided with an anti-intrusion system according to a first embodiment of the present invention.

FIG. 1 schematically shows a communication network CN provided with an anti-intrusion system according to a first embodiment of the present invention.

For simplicity, it is assumed that the communication network CN comprises only four network elements NE1, NE2, NE3' and NE4. Obviously, this is merely exemplary, since the communication network CN may comprise any number of network elements. Each network element NE1, NE2, NE3' and NE4 comprises one or more input/output ports for a respective data traffic. For simplicity, the input/output ports are not shown in FIG. 1.

Preferably, the network elements NE1, NE2, NE3' and NE4 form part of the same calculation grid G. As it is known, a calculation grid allows to execute distributed applications, i.e. it allows to share execution of a given application among all the computers forming the grid. In other words, the application is shared among all the computers forming the grid. Preferably, the computers forming the grid communicate with each other via web by means of an application which is termed "middleware". An exemplary calculation grid is the one proposed by the Globus Alliance, which uses the middleware Globus.

According to this embodiment, the network elements NE1, NE2, NE3' and NE4 of the communication network CN are connected the one to the others via web by means of a middleware. The Applicant has performed some positive tests by using the above mentioned middleware Globus.

Preferably, the communication network CN is further connected to a management terminal MT, which is configured to execute a browsing module B and is connected to anyone of the network elements of the grid G, e.g. the network element NE1. The browsing module B is capable of supporting a web-like management graphic interface, which for simplicity is not shown in the figures.

The web-like management graphic interface is suitable for displaying as graphic objects, such as windows and icons, management information relative to the management of the communication network CN, i.e.: resource configuration parameters of the network elements NE1, NE2, NE3' and NE4, resource performance parameters of the network elements NE1, NE2, NE3' and NE4, and any alarms generated by the network elements NE1, NE2, NE3' and NE4.

According to embodiments of the present invention, the calculation grid G cooperates with an anti-intrusion module AIM and an anti-intrusion monitoring module AIMM.

Figure 2:
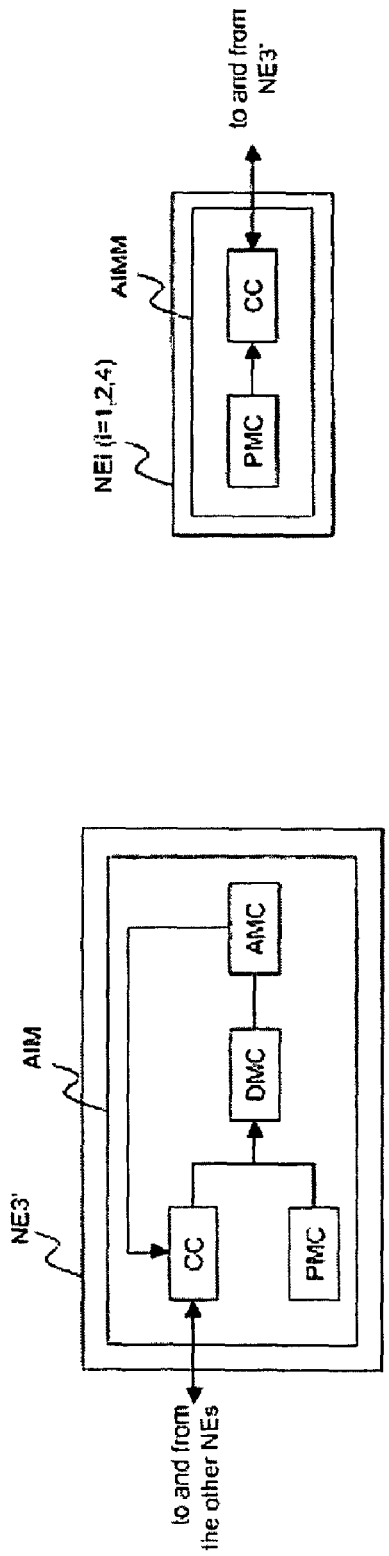
FIGS. 2 and 3 show in more detail, respectively, the structure of a first and second elements of the communication network of FIG. 1.

According to the first embodiment of the present invention and with reference to FIG. 2, the anti-intrusion module AIM is installed in one network element of the communication network CN, e.g. the network element NE3'.

Preferably, the anti-intrusion module AIM comprises: a passive monitoring component PMC, a communication component CC, a decision making component DMC and an action making component AMC.

The passive monitoring component PMC is preferably suitable for:
locally monitoring in a continuous way the management information traffic passing through the ports of the network element NE3';
processing these management information to generate possible infection data; and
providing the possible infection data to the decision making component DMC.

The decision making component DMC is preferably suitable for:
receiving possible infection data coming from the passive monitoring component PMC, and, through the communication component CC, from the other network elements;
making a decision, preferably in real time, on possible actions to be carried out to block a possible attack; and
transmitting such a decision to the action making component AMC.

The action making component AMC is configured to activate, based on the decision received from the decision making component DMC, the best blocking action to defend the communication network.

Preferably, the decision making component DMC decides on the basis of a pair of association tables, namely a static association table and a dynamic association table.

The static association table is compiled by the operator during the configuration step of the anti-intrusion module AIM, and it comprises a series of rows, each row including a security threshold value. Preferably, each security threshold value is associated to a respective behavior of the anti-intrusion module AIM. Table 1 provides an example of a static association table.

TABLE 1

| Security Threshold | AIM Behavior |
|---|---|
| 1 | DMC decides to exclude the infected network element from the communication network. AMC carries out the decision of excluding the infected network element from the communication network, by closing each port of the infected network element. CC carries out a continuous monitoring, thereby determining in real time any attack developments. |
| 2 | DMC decides to execute a "benign" code at the infected network element, thereby removing any infections. AMC carries out the decision of transmitting the "benign" code to the infected network element, through a port defined ad hoc. CC carries out a periodical monitoring, thereby determining any attack developments. For example, the network element is monitored every 10 minutes, and if the infection diffusion is detected, more invasive interventions are activated. |
| 3 | DMC decides to monitor the infected network element and to intervene only if dangerous developments are detected, e.g. the infection begins to propagate on the configuration files of the network element, or anomalies begin to occur in the memory operation. AMC carries out the decision of monitoring the infected network element. CC carries out a periodical monitoring, thereby determining any attack developments. For example the network element is monitored every hour, and if an infection diffusion is detected, more invasive interventions are activated. |

On the contrary, the dynamic association table is dynamically compiled on the basis of previous behaviors of the communication network CN, by using known auto-learning techniques. Preferably, the static association table and the dynamic association table are implemented as one table, wherein some rows are compiled in a static way and other rows are dynamically compiled.

Figure 3:
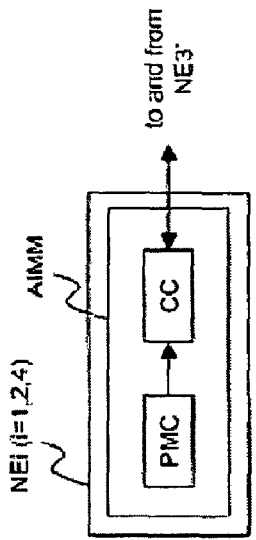

According to the first embodiment, the network elements NE1, NE2 and NE4 are provided with a respective anti-intrusion monitoring module AIMM. FIG. 3 shows in detail the structure of one of the network elements NE1, NE2 and NE4.

As shown in FIG. 3, the anti-intrusion monitoring module AIMM of the generic network element NEi (i=1, 2, 4) comprises a passive monitoring component PMC and a communication component CC, which are connected in cascade. The passive monitoring component PMC is suitable for:

locally monitoring in a continuous way the management information traffic flowing through the ports of the network element NEi (i=1, 2, 4);

processing these management information to generate possible infection data; and transmitting the possible infection data to the decision making component DMC of the network element NE3', by means of the communication component CC.

The communication component CC is thus suitable for putting the network element NEi (i=1, 2, 4) in communication with the network element NE3', possibly through other network elements of the calculation grid G.

The operation of the anti-intrusion system and the components thereof according to a first embodiment will be now described in detail with reference to FIGS. 1, 2 and 3.

It is assumed, for example, that the network element NE4 is attacked by a hacker, e.g. a DOS type attack. In this case, the infected network element NE4 tends to attack the other network elements of the communication network CN, for example by duplicating the management information and broadcasting them in the communication network CN, so as to overload the links between the network elements.

Two cases can occur. In a first case, the network element NE4 autonomously detects, by means of its passive monitoring component PMC, that it has been attacked and it communicates this to the other network elements, in particular to the network element NE3'. In the second case, the network element NE4 does not become aware to be infected. In this latter case, the other network elements of the communication network CN detect the infection of the network element NE4, by monitoring the management information exchanged on the grid G by means of their respective passive monitoring components PMC.

In both the situations, the passive monitoring component PMC of the network element which has detected the anomaly of the management information traffic at the network element NE4 generates infection data and transmits them to the decision making component DMC of the network element NE3'. In particular, if the infection is detected by the passive monitoring component PMC of the network element NE3', it directly transmits the infection data to the decision making component DMC. On the contrary, if the infection is detected by the passive monitoring component PMC of any other network element, it transmits the infection data to the decision making component DMC through its communication component CC.

On the basis of the infection data received, the decision making component DMC makes a decision. In particular, the decision making component DMC has a security threshold stored therein, which security threshold is selected among those above listed in Table 1. Preferably, the security threshold can be set up by the operator responsible of managing the communication network CN based on the needs of the costumer which uses the communication network. When the decision making component DMC receives the infection data indicating the infection of the network element NE4, it preferably determines if the security threshold has been overcome and, in the affirmative, selects the corresponding action within the static association table previously stored.

Alternatively, the decision making component DMC determines a new security threshold and a new corresponding action and updates the dynamic association table. For example, the decision making component DMC can decide to close the port of the network element NE4 through which the management information traffic flows, and to consequently command the action making component AMC. As a result, the action making component ACM commands the port closure by means of its communication component CC, thereby isolating the infected network element NE4 from the communication network CN.

Therefore, advantageously, the anti-intrusion system described above is active from the decisional point of view. This advantageously allows to react substantially in real time upon detection of any infection affecting one or more of the network elements, thereby containing the damage caused by the attack to the communication network CN.

Therefore, advantageously, the anti-intrusion system described above presents a particularly reduced delay between the detection time of the attack and the time at which the infected network element is isolated, since the communication network CN itself automatically reacts to the external attacks, without requiring the operator's intervention.

Moreover, the anti-intrusion system described above is implemented at the network elements of the communication network. This advantageously results in a decentralization of the anti-intrusion mechanism, thus allowing to reduce the amount of calculation resources dedicated to the implementation of the anti-intrusion mechanism at the management terminal MT.

Figure 4:
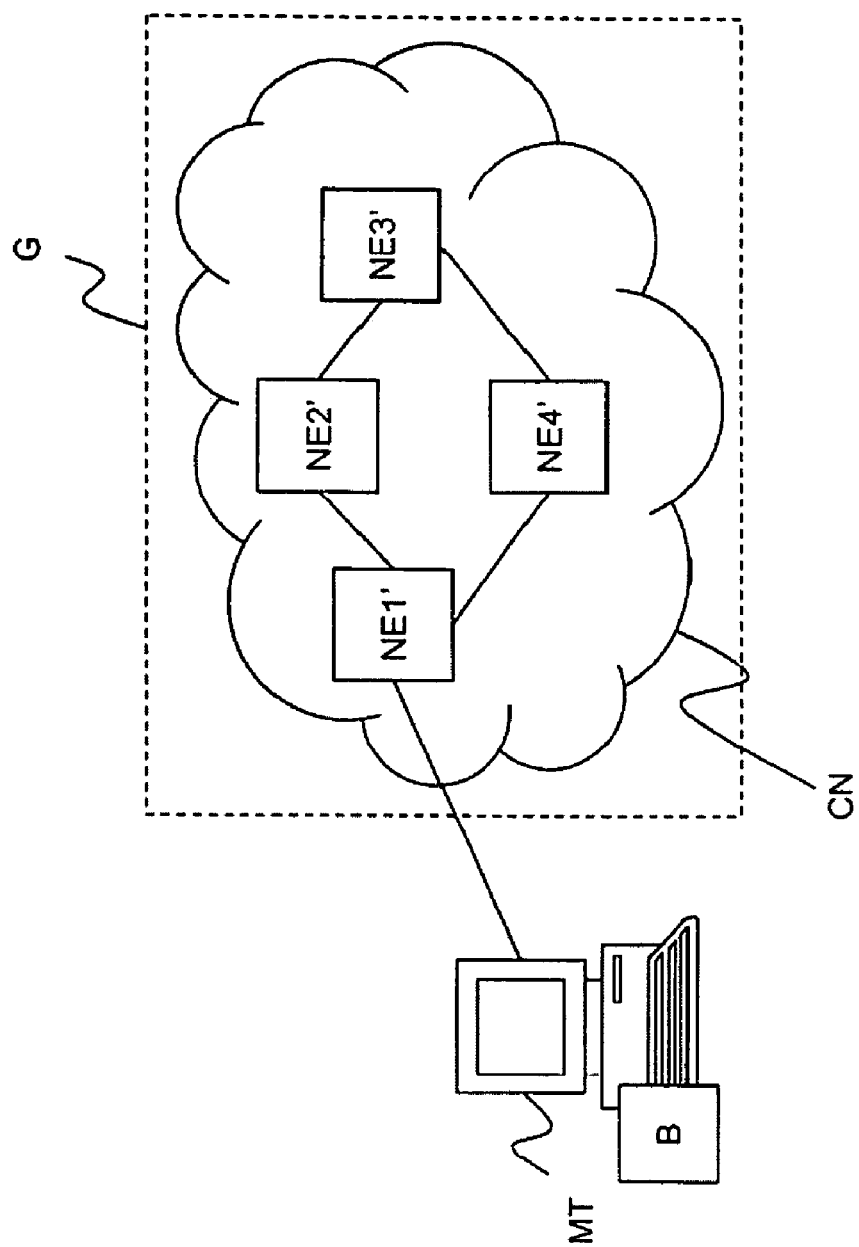
FIG. 4 schematically shows a communication network provided with an anti-intrusion system according to a second embodiment of the present invention.

According to a second embodiment of the present invention, shown in FIG. 4, each network element NE1', NE2', NE3' and NE4' is provided with a respective anti-intrusion module AIM. In particular, the network elements NE1', NE2', NE3' and NE4' have all a structure similar to that of the network element NE3', shown in FIG. 2.

Then, according to this second embodiment, each network element NE1', NE2', NE3' and NE4' is capable of independently managing a possible attack. In other word, in the event of an attack attempt, each network element is capable of:

deciding, independently and substantially in real time, an action to be carried out (decision making component DMC); and making the decided action (action making component AMC).

Therefore, advantageously, in the event the anti-intrusion module AIM of one of the network elements stops to operate, the other network elements of the communication network CN continue to be suitable for executing all the operations provided from the above described anti-intrusion system (monitoring, decision making, action making).

Figure 5:
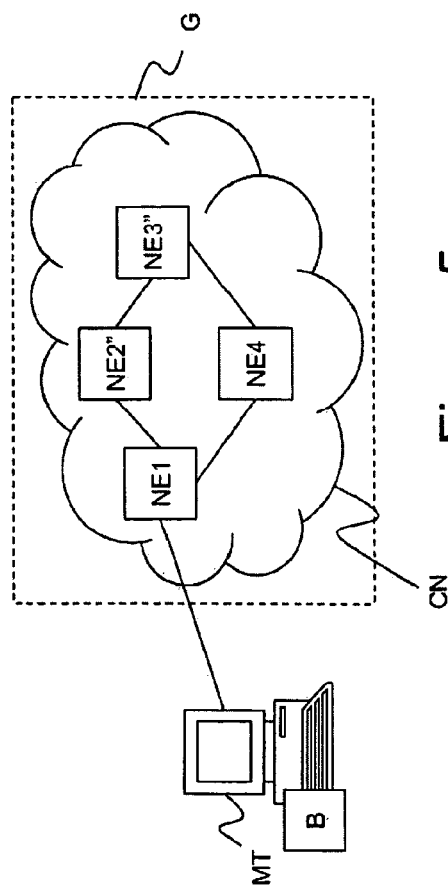
FIG. 5 schematically shows a communication network provided with an anti-intrusion system according to a third embodiment of the present invention.
Figure 7:
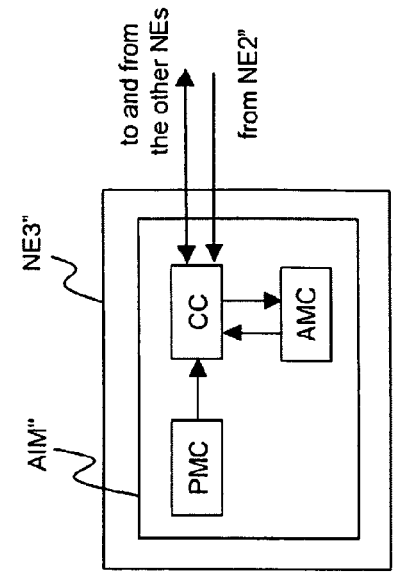
FIGS. 6 and 7 show in more detail, respectively, the structure of a first and second network elements of the communication network of FIG. 5.
Figure 6:
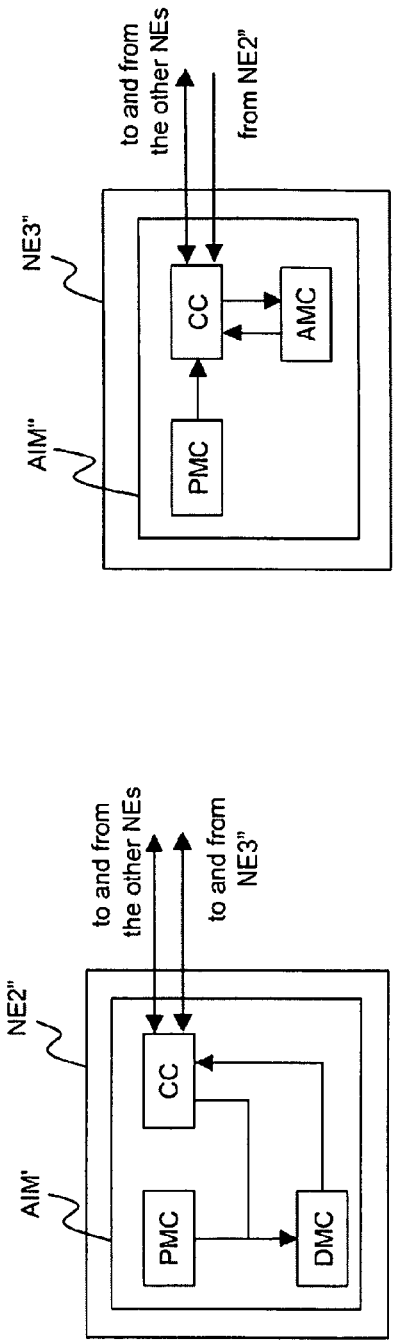

According to a third embodiment of the present invention, shown in FIGS. 5 to 7, the decision making and action making functions are separately implemented in respective network elements of the communication network CN.

For example, each network element NE1, NE4 comprises a respective anti-intrusion monitoring module AIMM similar to that shown in FIG. 3.

Moreover, for example, the network element NE2" comprises a module AIM' with a passive monitoring component PMC, a communication component CC and a decision making component DMC.

The passive monitoring component PMC is preferably suitable for:

locally monitoring in a continuous way the management information flowing through the ports of the network element NE2";

processing these management information, thereby generating possible infection data; and transmitting the possible infection data to the decision making component DMC.

The decision making component DMC is preferably suitable for:

receiving the infection data coming from the passive monitoring component PMC, and by means of the communication component CC, from the other network elements;

making a decision, preferably in real time, on the possible actions to be made in order to block any attacks; and transmitting such a decision to the network element NE3", through the communication component CC.

Moreover, for example, the network element NE3" comprises a module AIM" with a passive monitoring component PMC, a communication component CC and an action making component AMC.

The passive monitoring component PMC is preferably suitable for:

locally monitoring in a continuous way the management information traffic flowing through the ports of the network element NE3";

processing these management information thereby generating possible infection data; and transmitting the possible infection data to the network element NE2" by means of the communication component CC.

The action making component AMC is preferably suitable for:

receiving the decision from the network element NE2"; and transmitting corresponding instructions to the other network elements, through the communication component CC.

Therefore, advantageously, the decision making function and the action making function may be separately located within the communication network according to various criteria, such as for instance: topology of the communication network CN, position of the infected network element(s), and so on.

According to a fourth embodiment of the present invention, the decision making function is implemented in a first group of network elements of the communication network CN, which in the following is termed "decision making cluster". In addition or as an alternative, the action making function is implemented in a second group of network elements, which in the following is termed "action making cluster".

Figure 8:
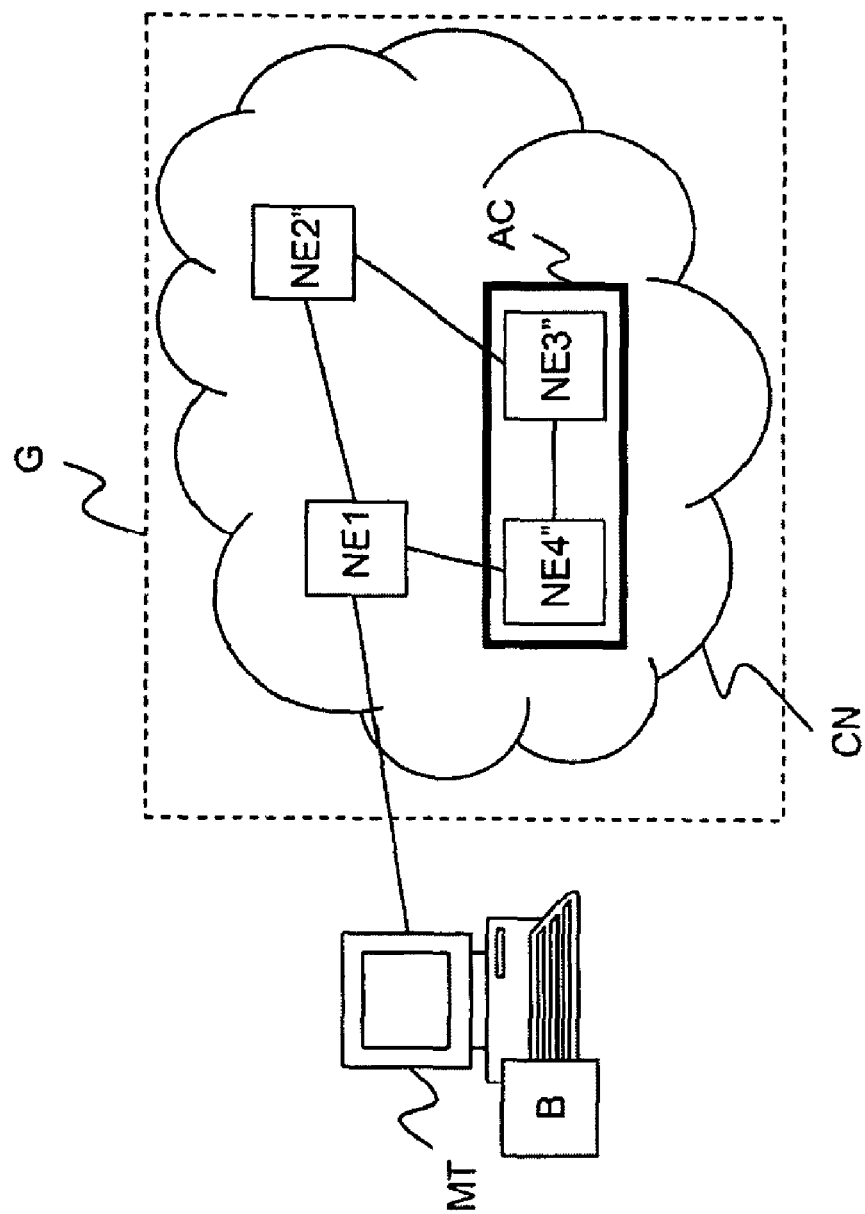
FIG. 8 schematically shows a communication network provided with an anti-intrusion system according to a fourth embodiment of the present invention.

For example, in the embodiment shown in FIG. 8, the decision making function is implemented at the network element NE2", whose structure is preferably similar to that shown in FIG. 6. On the other hand, the action making function is implemented in an action making cluster AC formed by the network elements NE3" and NE4". The structure of the network elements NE3" and NE4" is preferably similar to that shown in FIG. 7. Finally, the network element NE1 carries out the monitoring function only and therefore it has a structure preferably similar to that shown in FIG. 3.

The composition of a decision making cluster and/or an action making cluster may be determined either by the operator or by the communication network CN itself according to different criteria, such as for instance: available calculation resources (the network elements NE3" and NE4" could be the ones with the greatest amount of available calculation resources), topology of the communication network CN, number of hops between the infected network element and the network elements implementing the decision making function and the action making function.

Further, advantageously, duplicating the decision function and/or the action function within the communication network CN advantageously allows to ensure that such functions continue being implemented even though one of the network elements belonging to the group become failed.

Although the above described anti-intrusion system is particularly suitable for protecting the communication network CN against attacks to the control plane and the management plane, it may be profitable used to face also attacks to the data plane. For example, if a hacker succeeds in accessing not only the management information flowing through a network element, but also in applying wrong values to the configuration parameters of the network element, this involves a possible risk of an infection at the data plane, i.e. of an infection of the paying traffic. This situation should be avoided, owing to the economical damages it would cause to the communication network manager.

In order to obviate to this drawback, the inventive anti-intrusion system preferably provides that the network element that is infected at the management plane simulates a failure, by interrupting the transmission of the paying traffic. In this way, the other network elements of the communication network CN activate a restoration mechanism, which reroutes the paying traffic along an alternative path which does not include the infected network element.

Therefore, advantageously, also according to the second, third and fourth embodiments of the present invention, the anti-intrusion system is active from the decisional point of view. This advantageously allows to react substantially in real time upon detection of an attack against one or more of the network elements, thereby preventing the infected network element(s) from transmitting the "infection" to the other network elements.

Therefore, advantageously, the anti-intrusion system described above presents a particularly reduced delay between the detection time of the attack and the time at which the infected network element is isolated, since the communication network CN itself automatically reacts to the external attacks, without requiring the operator's intervention.

The invention claimed is:

1. An anti-intrusion method for a communication network, said communication network comprising a plurality of network elements, the method comprising the following steps:
  a) providing a passive monitoring component, a decision making component and an action making component cooperating with said communication network;
  b) at said passive monitoring component, detecting management information indicative of an attack against at least one network element of said plurality of network elements, processing said management information thus generating infection data, and transmitting said infection data to said decision making component;
  c) at said decision making component, receiving said infection data, making a decision about an action to be carried out to block said attack, and transmitting said decision to said action making component; and
  d) at said action making component, based on the decision, instructing said at least one network element to perform said action,
  wherein said step a) comprises providing said passive monitoring component at each of said plurality of network elements, and wherein said step a) further comprises at least one of the following steps:
  providing said decision making component at at least two of said plurality of network elements, thus forming a decision making cluster; and
  providing said action making component at at least another two of said plurality of network elements, thus forming an action making cluster.

2. An anti-intrusion method for a communication network, said communication network comprising a plurality of network elements, the method comprising the following steps:
  a) providing a passive monitoring component, a decision making component and an action making component cooperating with said communication network;
  b) at said passive monitoring component, detecting management information indicative of an attack against at least one network element of said plurality of network elements, processing said management information thus generating infection data, and transmitting said infection data to said decision making component;
  c) at said decision making component, receiving said infection data, making a decision about an action to be carried out to block said attack, and transmitting said decision to said action making component; and
  d) at said action making component, based on the decision, instructing said at least one network element to perform said action,
  wherein said step a) comprises providing said passive monitoring component at each of said plurality of network elements, wherein said step a) further comprises at least one of the following steps:
  providing said decision making component at at least two of said plurality of network elements, thus forming a decision making cluster; and
  providing said action making component at at least another two of said plurality of network elements, thus forming an action making cluster.

3. An anti-intrusion method for a communication network, said communication network comprising a plurality of network elements, the method comprising the following steps:
  a) providing a passive monitoring component, a decision making component and an action making component cooperating with said communication network;
  b) at said passive monitoring component, detecting management information indicative of an attack against at least one network element of said plurality of network elements, processing said management information thus generating infection data, and transmitting said infection data to said decision making component;
  c) at said decision making component, receiving said infection data, making a decision about an action to be carried out to block said attack, and transmitting said decision to said action making component; and
  d) at said action making component, based on the decision, instructing said at least one network element to perform said action,
  wherein said step a) comprises providing said passive monitoring component at each of said plurality of network elements, wherein said step c) further comprises making said decision by using at least one of a static association table and a dynamic association table, each of said static association table and said dynamic association table comprising a plurality of rows, each of said plurality of rows including a security threshold value and a possible action associated to said security threshold value.

4. An anti-intrusion system for a communication network, said communication network comprising a plurality of network elements, the system comprising: a passive monitoring component, a decision making component, and an action making component cooperating with said communication network, wherein:
  said passive monitoring component is suitable for detecting management information indicative of an attack against at least one network element of said plurality of network elements, processing said management information thus generating infection data, and transmitting said infection data to said decision making component;
  said decision making component is suitable for receiving said infection data, making a decision about an action to be carried out to block said attack, and transmitting said decision to said action making component; and
  said action making component is suitable for, based on said decision, instructing said at least one network element to perform said action,
  wherein said passive monitoring component is provided at each of said plurality of network elements, wherein said decision making component and said action making component are provided at each of said plurality of network elements.

5. An anti-intrusion system for a communication network, said communication network comprising a plurality of network elements, the system comprising: a passive monitoring component, a decision making component, and an action making component cooperating with said communication network, wherein:
  said passive monitoring component is suitable for detecting management information indicative of an attack against at least one network element of said plurality of network elements, processing said management information thus generating infection data, and transmitting said infection data to said decision making component;
  said decision making component is suitable for receiving said infection data, making a decision about an action to be carried out to block said attack, and transmitting said decision to said action making component; and
  said action making component is suitable for, based on said decision, instructing said at least one network element to perform said action,
  wherein said passive monitoring component is provided at each of said plurality of network elements, and wherein:
  said decision making component is provided at at least two of said plurality of network elements, thus forming a decision making cluster; and/or
  said action making component is provided at at least another two of said plurality of network elements, thus forming an action making cluster.

6. An anti-intrusion system for a communication network, said communication network comprising a plurality of network elements, the system comprising: a passive monitoring component, a decision making component, and an action making component cooperating with said communication network, wherein:
  said passive monitoring component is suitable for detecting management information indicative of an attack against at least one network element of said plurality of network elements, processing said management information thus generating infection data, and transmitting said infection data to said decision making component;
  said decision making component is suitable for receiving said infection data, making a decision about an action to be carried out to block said attack, and transmitting said decision to said action making component; and
  said action making component is suitable for, based on said decision, instructing said at least one network element to perform said action,
  wherein said passive monitoring component is provided at each of said plurality of network elements, and wherein said system further comprises at least one of a static association table and a dynamic association table, each of said static association table and said dynamic association table comprising a plurality of rows, each of said plurality of rows including a security threshold value and a possible action associated to said security threshold value, said decision making component being suitable for making said decision by using said at least one of said static association table and said dynamic association table.

7. An anti-intrusion system for a communication network, said communication network comprising a plurality of network elements, the system comprising: a passive monitoring component, a decision making component, and an action making component cooperating with said communication network, wherein:
  said passive monitoring component is suitable for detecting management information indicative of an attack against at least one network element of said plurality of network elements, processing said management information thus generating infection data, and transmitting said infection data to said decision making component;
  said decision making component is suitable for receiving said infection data, making a decision about an action to be carried out to block said attack, and transmitting said decision to said action making component; and
  said action making component is suitable for, based on said decision, instructing said at least one network element to perform said action,
  wherein said passive monitoring component is provided at each of said plurality of network elements, wherein said decision making component and said action making component are provided at one of said plurality of network elements, and wherein said system further comprises at least one of a static association table and a dynamic association table, each of said static association table and said dynamic association table comprising a plurality of rows, each of said plurality of rows including a security threshold value and a possible action associated to said security threshold value, said decision making component being suitable for making said decision by using said at least one of said static association table and said dynamic association table.

8. An anti-intrusion system for a communication network, said communication network comprising a plurality of network elements, the system comprising: a passive monitoring component, a decision making component, and an action making component cooperating with said communication network, wherein:
  said passive monitoring component is suitable for detecting management information indicative of an attack against at least one network element of said plurality of network elements, processing said management information thus generating infection data, and transmitting said infection data to said decision making component;
  said decision making component is suitable for receiving said infection data, making a decision about an action to be carried out to block said attack, and transmitting said decision to said action making component; and
  said action making component is suitable for, based on said decision, instructing said at least one network element to perform said action,
  wherein said passive monitoring component is provided at each of said plurality of network elements, wherein said decision making component and said action making component are provided at each of said plurality of network elements, and wherein said system further comprises at least one of a static association table and a dynamic association table, each of said static association table and said dynamic association table comprising a plurality of rows, each of said plurality of rows including a security threshold value and a possible action associated to said security threshold value, said decision making component being suitable for making said decision by using said at least one of said static association table and said dynamic association table.

9. An anti-intrusion system for a communication network, said communication network comprising a plurality of network elements, the system comprising: a passive monitoring component, a decision making component, and an action making component cooperating with said communication network, wherein:
  said passive monitoring component is suitable for detecting management information indicative of an attack against at least one network element of said plurality of network elements, processing said management information thus generating infection data, and transmitting said infection data to said decision making component;
  said decision making component is suitable for receiving said infection data, making a decision about an action to be carried out to block said attack, and transmitting said decision to said action making component; and
  said action making component is suitable for, based on said decision, instructing said at least one network element to perform said action,
  wherein said passive monitoring component is provided at each of said plurality of network elements, wherein said decision making component is provided at one of said plurality of network elements and said action making component is provided at another one of said plurality of network elements and wherein said system further comprises at least one of a static association table and a dynamic association table, each of said static association table and said dynamic association table comprising a plurality of rows, each of said plurality of rows including a security threshold value and a possible action associated to said security threshold value, said decision making component being suitable for making said decision by using said at least one of said static association table and said dynamic association table.

10. An anti-intrusion system for a communication network, said communication network comprising a plurality of network elements, the system comprising: a passive monitoring component, a decision making component, and an action making component cooperating with said communication network, wherein:
  said passive monitoring component is suitable for detecting management information indicative of an attack against at least one network element of said plurality of network elements, processing said management information thus generating infection data, and transmitting said infection data to said decision making component;
  said decision making component is suitable for receiving said infection data, making a decision about an action to be carried out to block said attack, and transmitting said decision to said action making component; and
  said action making component is suitable for, based on said decision, instructing said at least one network element to perform said action,
  wherein said passive monitoring component is provided at each of said plurality of network elements, and wherein:
  said decision making component is provided at at least two of said plurality of network elements, thus forming a decision making cluster; and/or
  said action making component is provided at at least another two of said plurality of network elements, thus forming an action making cluster and wherein said system further comprises at least one of a static association table and a dynamic association table, each of said static association table and said dynamic association table comprising a plurality of rows, each of said plurality of rows including a security threshold value and a possible action associated to said security threshold value, said decision making component being suitable for making said decision by using said at least one of said static association table and said dynamic association table.

* * * * *